United States Patent
Warren, III

[11] Patent Number: 5,791,593
[45] Date of Patent: Aug. 11, 1998

[54] EASY-ATTACHABLE WHEEL APPARATUS FOR HELICOPTERS

[76] Inventor: Wilbur Warren, III, 7030 - 327th Ave., Burlington, Wis. 53105

[21] Appl. No.: 634,148

[22] Filed: Apr. 19, 1996

[51] Int. Cl.[6] ................................. B64C 25/36
[52] U.S. Cl. ..................... 244/17.17; 244/103 R; 244/108; 280/7.12
[58] Field of Search .................... 244/50, 17.17, 244/108, 101, 103 R; 280/7.12, 7.14, 32

[56] References Cited

U.S. PATENT DOCUMENTS

| | | | |
|---|---|---|---|
| 922,029 | 5/1909 | Pearce | 280/32 |
| 2,455,281 | 11/1948 | Teta | 280/7.12 |
| 3,057,634 | 10/1962 | Long | 280/7.12 |
| 3,279,722 | 10/1966 | Glover, Jr. et al. | 244/50 |
| 3,506,222 | 4/1970 | Anderson | 244/101 |
| 4,033,422 | 7/1977 | Benning | 180/14 C |
| 4,223,856 | 9/1980 | DiVencenzo | 244/50 |
| 4,516,744 | 5/1985 | Burnside | 244/17.17 |
| 4,895,319 | 1/1990 | Bardsen et al. | 244/50 |
| 5,071,151 | 12/1991 | Irwin | 280/402 |

FOREIGN PATENT DOCUMENTS

| | | | |
|---|---|---|---|
| 646336 | 8/1962 | Canada | 280/32 |
| 4-31197 | 2/1992 | Japan | 244/50 |

*Primary Examiner*—Virna Lissi Mojica
*Attorney, Agent, or Firm*—Jansson, Shupe, Bridge & Munger, Ltd.

[57] ABSTRACT

An easily-attachable supplemental wheel apparatus that allows one person to perform the ground-handling functions necessary to maneuver an aircraft or helicopter having a skid configured landing gear. The apparatus includes an axle extending across the landing skids having a pair of spaced eyelets attached to the axle in such a position that one of the landing skids can easily slide through each eyelet. The apparatus includes a pair of wheels rotatably attached to the axle to allow for easy ground movement along with an attachment for securing the axle to the airframe.

10 Claims, 4 Drawing Sheets

EASY-ATTACHABLE WHEEL APPARATUS FOR HELICOPTERS

FIELD OF THE INVENTION

This invention is related generally to devices used for the ground handling of aircraft and, more particularly, for the ground transport of helicopters equipped with skid-type landing gear.

BACKGROUND OF THE INVENTION

Certain models of lightweight aircraft in general, and helicopters in particular, have been configured with skid-type landing gear so that they may operate in and out of areas that do not have a prepared surface. While the skid configuration does allow for flexibility of flight operations, it becomes a major obstacle to the easy maneuvering and positioning of the helicopter once it has landed and its engine has been shut down.

The maneuvering and positioning of a helicopter on the ground—commonly known as ground handling—has typically been accomplished through the use of ground-handling wheels. These wheels, which are normally factory supplied with the aircraft, are usually only attached to the skid when the aircraft is on the ground. The typical ground-handling wheels include a camming device that is used to lift the skids off the ground, thus making the wheels functional. Although the ground-handling wheels assist in the ground movement of the helicopter, they do create several problems.

One problem associated with the ground-handling wheels is that it is necessary to rotate the helicopter around the axis formed by such wheel devices—typically by pulling the helicopter tailboom down—in order to move the helicopter. With such arrangement, it is somewhat difficult or cumbersome to maneuver the helicopter in different directions. Such maneuvering is all done by gripping the tailboom which, because of its length, requires substantial lateral movement for significant turning of the helicopter—all while holding the tailboom in the vertical position which allows ground clearance beneath the fronts of the skids. These sorts of movements are somewhat burdensome for one person; two people are usually involved.

A related problem associated with such conventional ground-handling wheels is that, because they are attached to the landing skids in line with the helicopter's center of gravity, they tend to tip the helicopter forward resulting in a slightly nose-down configuration. This nose-down position, in addition to being somewhat unstable, increases the chance of stubbing the landing skids on any ground protrusion on the ramp or hangar floor. Such a stubbing could cause damage.

Several devices have been developed to help overcome the problems inherent with the use of the ground-handling wheels. One such device is disclosed in the U.S. Pat. No. 4,516,744 (Burnside). The Burnside device shows a dolly assembly of tandem wheel assemblies. In its most pertinent disclosure, Burnside shows a dolly assembly providing a pair of front wheels for use with the ground-handling wheels. A disadvantage of the Burnside invention is that it involves a complex structure that requires a maneuvering device, such as a steering arm or tow bar, in order to maneuver or steer the assembly. This requirement results in the need for extra handling and/or parking space, and also presents a possible safety hazard when the maneuvering device is left connected to a parked aircraft.

A second device to aid in the ground-handling of skid configured aircraft is disclosed in U.S. Pat. No. 4,233,856 (DiVincenzo). This invention involves the use of a yoke, secured at its ends to the existing wheel attachment points. A problem associated with the DiVincenzo invention is that requires a mobil lifting dolly, such as an hydraulic jack, to raise the helicopter's skids off of the ground. Because this device requires that the helicopter be essentially hinged at the yoke connection to the mobile lifting device, it creates an unstable balance situation.

U.S. Pat. No. 4,033,422 (Benning) described a self-propelled frame and a jacking system for engagement with a strong point on the underside of the aircraft structure. As with the DiVincenzo invention, this device also places the helicopter in an unstable situation due to the lifting apparatus.

A simple structure that is easily-attachable and provides a stable base for the helicopter while allowing one person to maneuver the aircraft would be an important advancement in the art.

OBJECTS OF THE INVENTION

An object of the invention is to provide a new apparatus to facilitate the ground handling of landing skid configured aircraft that overcome some of the problems and shortcomings of the prior art.

Another object of the invention is to provide an easily-attachable wheel apparatus for a skid configured helicopter.

Still another object of the invention is to provide an easily-attachable wheel apparatus for a skid configured helicopter that allows the helicopter to be maneuvered by one person.

Yet another object of the invention is to provide an easily-attachable wheel apparatus that can be attached to the helicopter without the use of special tools.

Another object of the invention is to provide an easily-attachable wheel apparatus that can be maneuvered without the use of a steering arm. How these and other objects are accomplished will become apparent from the following descriptions and from the drawings.

SUMMARY OF THE INVENTION

The invention provides a novel apparatus for facilitating ground-handling of a helicopter having skid configured landing gear. The apparatus involves an axle that extends across the skids, a pair of spaced eyelets that are affixed to the axle in such a position that each eyelet can receive one of the skids, a pair of wheels rotatably attached to the axle, and a means for securing the axle to the helicopter.

In a specific embodiment of the invention, a handle is attached to the midpoint of the axle to assist in carrying the apparatus. In a preferred embodiment of the invention, the axle comprises at least a pair of telescoping elongate members that are adjustable to at least two different axle lengths. In a highly preferred embodiment, the axle comprises at least three telescoping elongate members. These telescoping members allow the axle length to be adjusted so that the apparatus could be used on helicopters with various skid widths.

The apparatus is attached to the helicopter through the use of a pair of eyelets connected to the axle. Both eyelets have an opening that is large enough to allow an individual to easily insert a skid.

After the apparatus is placed over the landing skids, it is secured to the helicopter using a means that comprises a pair of straps that are secured with respect to the axle. In a preferred embodiment of the invention, the apparatus is secured with respect to one of the helicopter's struts. In a more specific embodiment, the straps are of a flexible material.

In a highly preferred embodiment of the invention, each strap has a plurality of hooks layered on one side thereof and a plurality of loops layered on the other side thereof such that the two sides are secured together when pressed together, thereby facilitating securement of the axle to the helicopter.

DETAILED DESCRIPTION OF THE DRAWINGS

Figure 1:
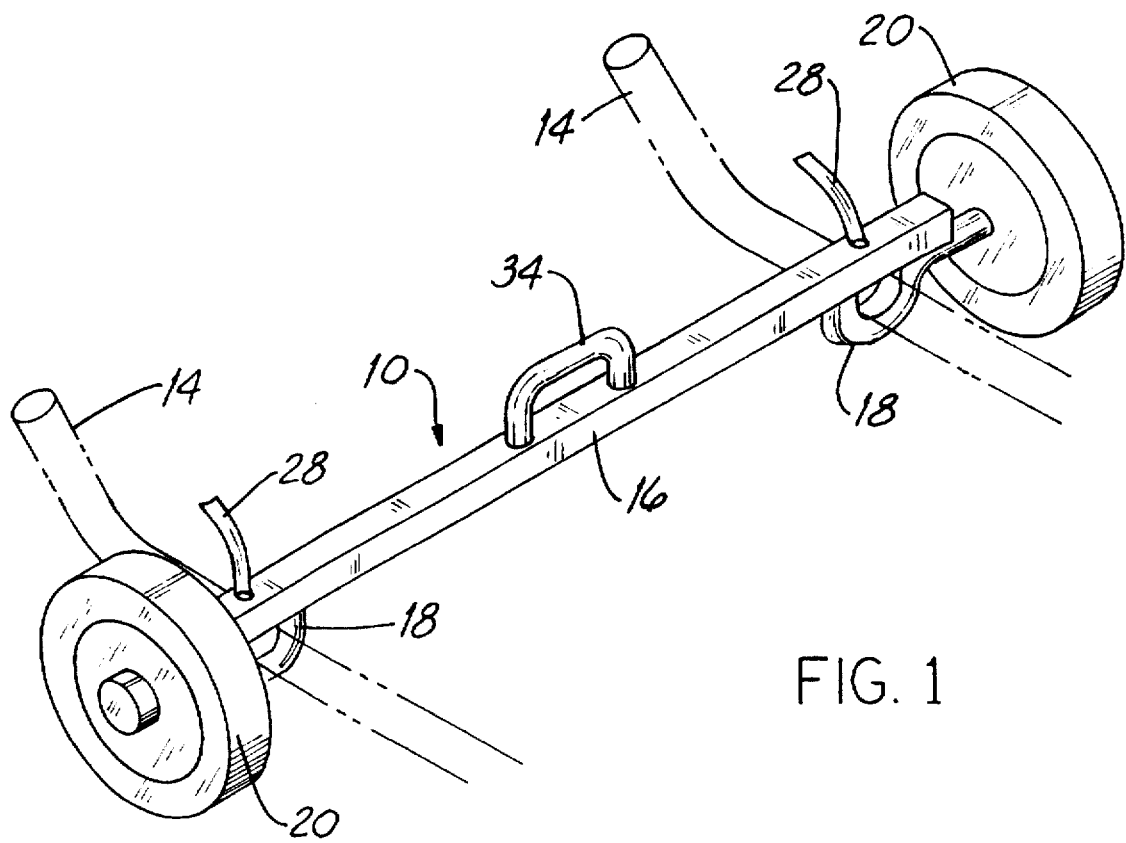
FIG. 1 is a perspective view of the apparatus showing how the it would be fitted over the landing skids.
Figure 4:
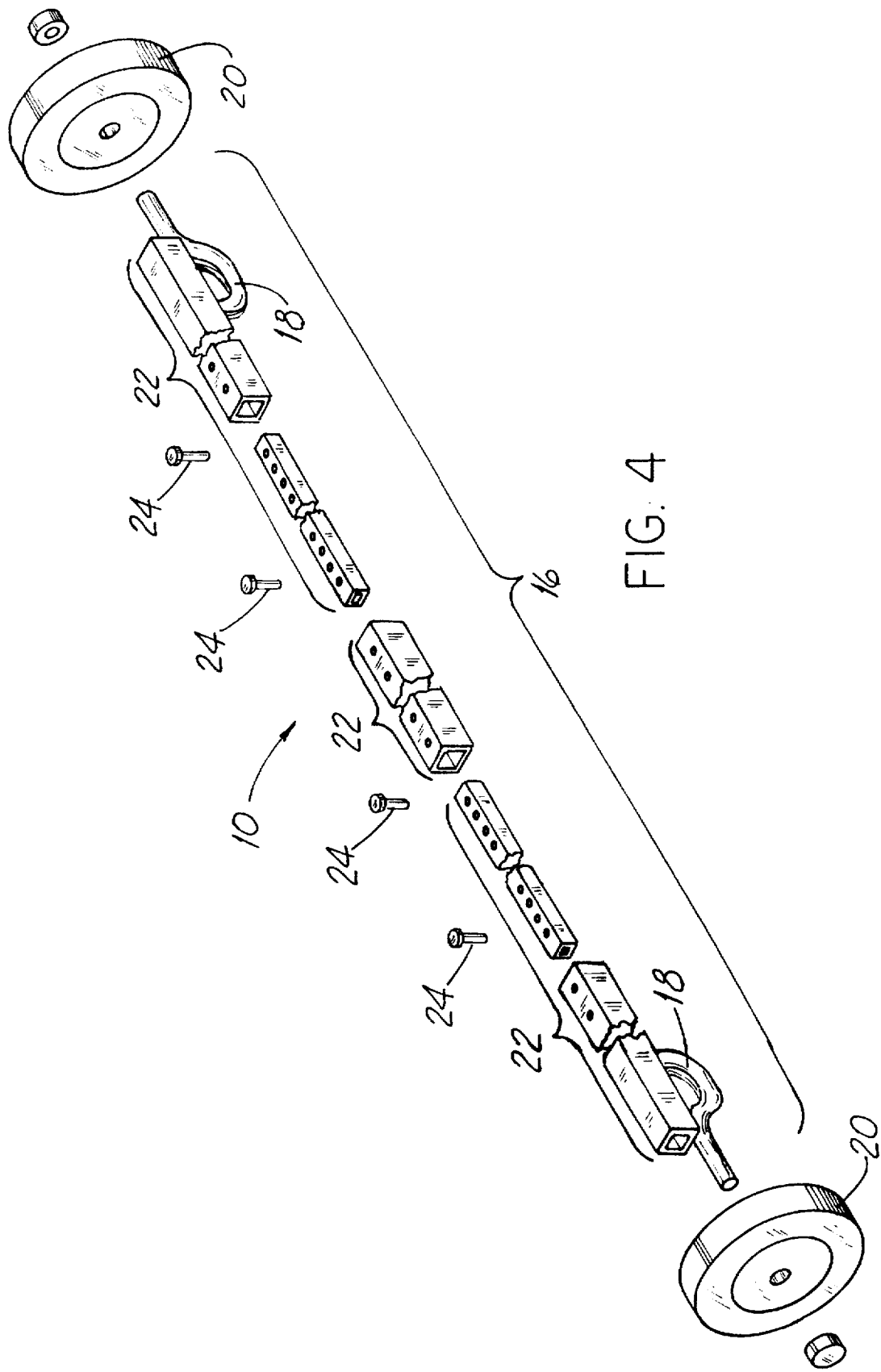
FIG. 4 is a perspective of view of the apparatus showing cut-aways of the telescoping members and their retaining pins.

FIG. 1, shows an apparatus 10 for facilitating ground-handling of a helicopter 12 having a skid configured landing gear 14. The apparatus 10 is comprised of an axle 16 that extends across the skids 14, a pair of spaced eyelets 18 that are affixed to the axle 16 in such a position so as to allow each eyelet 18 to receive one of the skids 14, a pair of wheels 20 rotatably attached to the axle 16, as shown in FIG. 4, and a means for securing the axle 16 to the helicopter 12.

Figure 3:
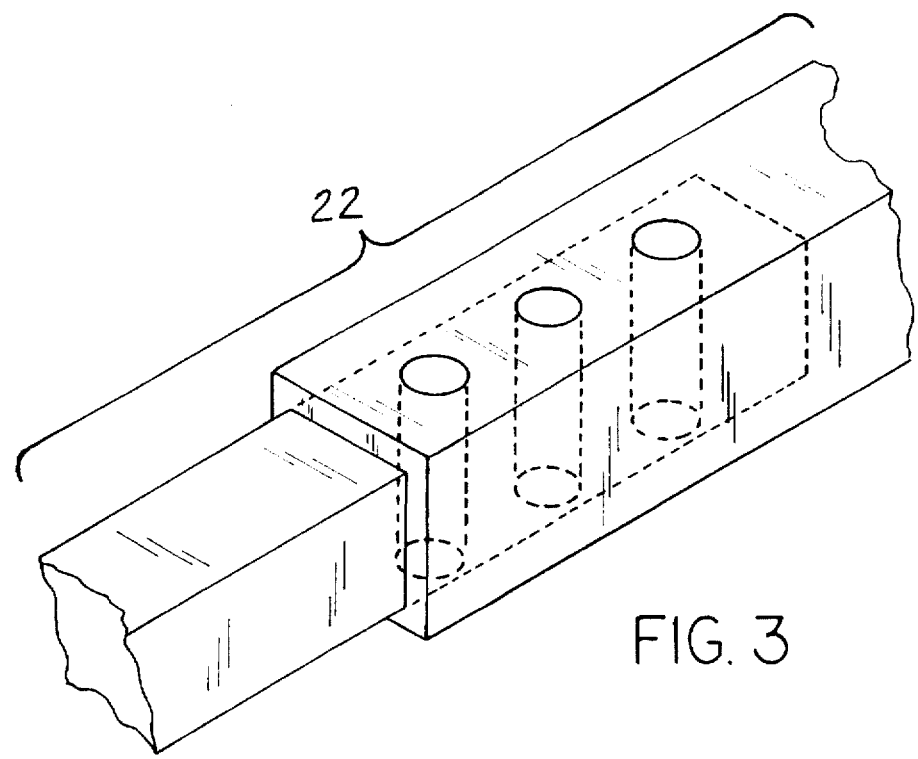
FIG. 3 is a perspective of a portion of the telescoping members of the apparatus showing the adjustment positions.

FIG. 1 shows a specific embodiment of the invention in which a handle 34 is attached to the midpoint of the axle 16 to assist in carrying the apparatus 10. In a preferred embodiment of the invention, as shown in FIGS. 3 and 4, the axle 16 comprises at least a pair of telescoping elongate members 22 that are adjustable to at least two different axle lengths. These telescoping members 22 allow the axle length to be adjusted so that the apparatus can be used on a variety of helicopters 12 having various skid widths. Once the desired axle length has been selected, retaining pins 24, as shown in FIGS. 3 and 4, are inserted to hold the telescoping members 22 in place. In a specific version of this embodiment, the axle 16 is comprised of at least three telescoping elongate members 22.

Figure 5:
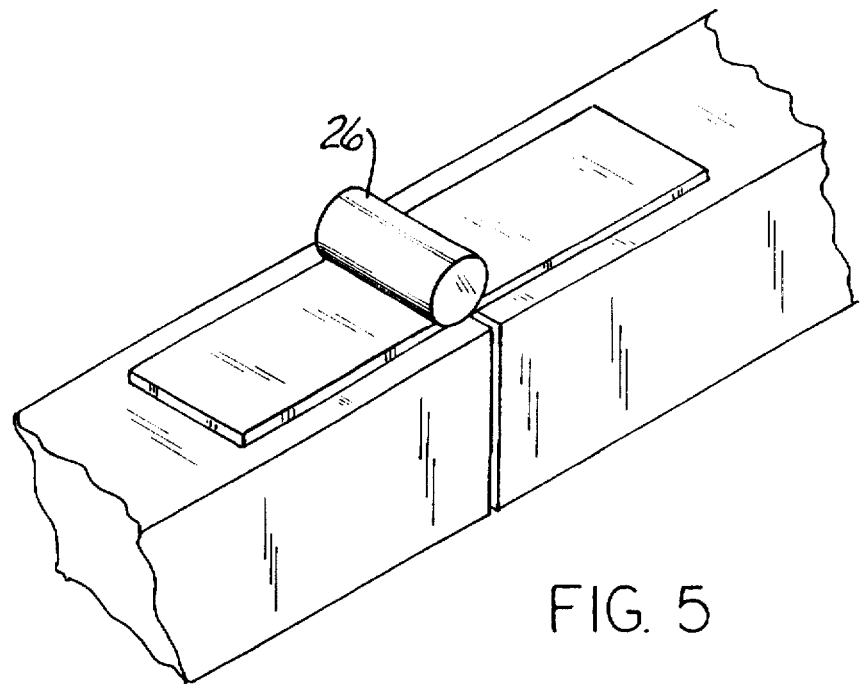
FIG. 5 is a perspective of the storage hinge mounted on the center of the apparatus.

In a highly preferred embodiment of the invention, a hinge 26, as shown in FIG. 5, is attached to the center section of the axle 16. This hinge 26, which is used primarily on an apparatus 10 designed for large helicopters 12, allows the axle 16 to be folded in the middle to allow for easy storage.

Figure 2:
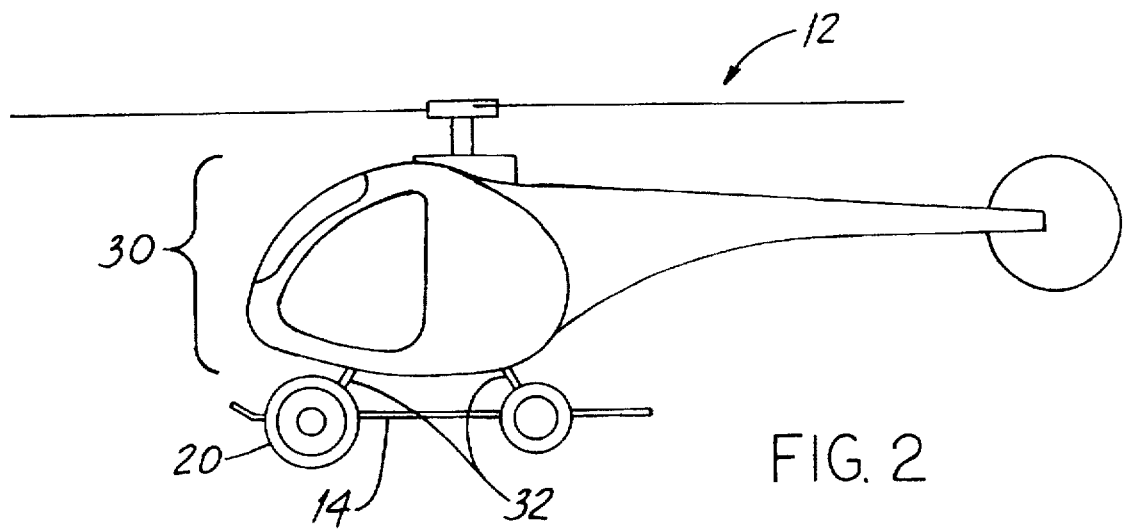
FIG. 2 is a schematic side elevation of a helicopter showing the apparatus of the invention attached to the front of the landing skids.

FIGS. 1 and 2, show the apparatus 10 attached to the helicopter 12 through the use of a pair of eyelets 18 connected to the axle 16. The opening of each eyelet 18 is large enough to allow one person to easily insert the skids 14 thus, facilitating ease of handling.

After the apparatus is placed over the landing skids 14, as shown in FIG. 1, it is secured to the helicopter 12 using a means that comprises a pair of straps 28 that are secured with respect to the axle 16. By connecting the straps 28 to a portion of the airframe 30 by one of several methods such as tying or buckling, the straps 28 allow the axle 16 to be affixed to the helicopter 12 in a variety of ways.

Figure 6:
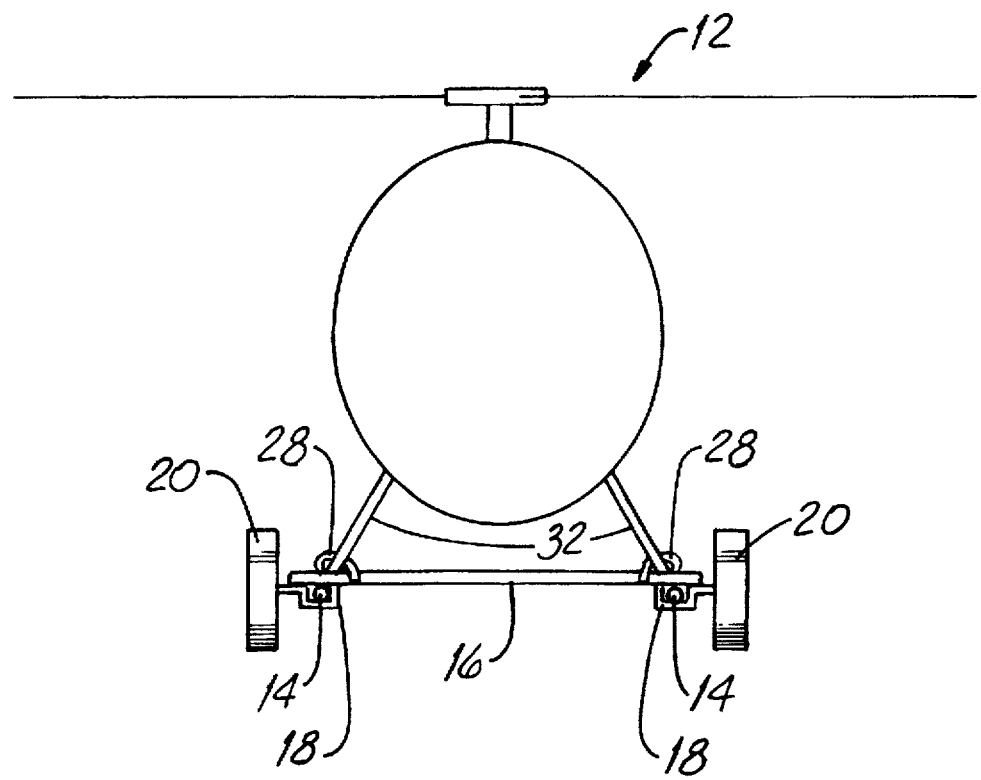
FIG. 6 is a schematic front view of the helicopter showing the apparatus of the invention mounted on the landing skids and secured to the airframe struts.

In a preferred embodiment of the invention, as shown in FIG. 6, the apparatus 10 is secured with respect to the heli-copter's struts 32. In a more specific embodiment, the straps 28 are made of a flexible material such as cloth or leather.

Figure 7:
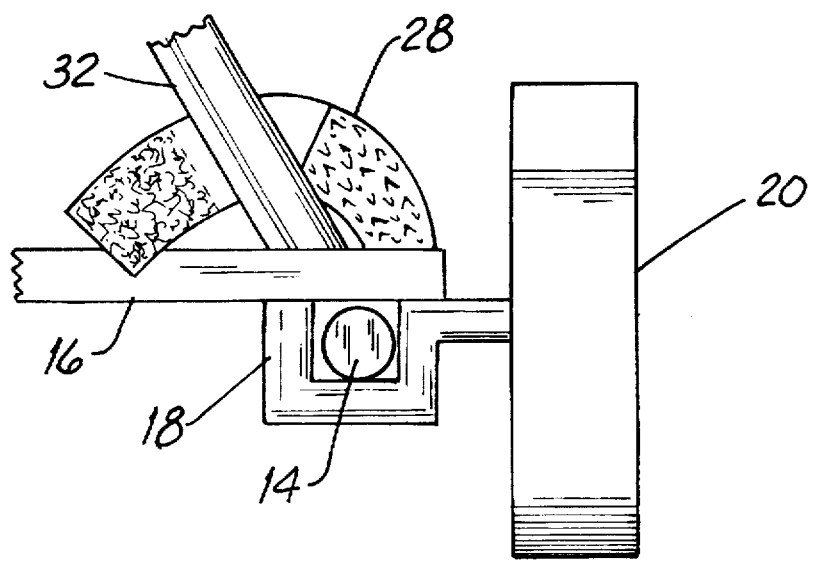
FIG. 7 is a perspective of an attachment strap having a plurality of hooks layered on one side thereof and a plurality of loops layered on the other side thereof.

In a highly preferred embodiment of the invention, as shown in FIG. 7, each strap 28 has a plurality of hooks layered on one side thereof and a plurality of loops layered on the other side thereof such that the two sides are secured together when pressed together, thereby facilitating securement of the axle 16 to the helicopter 12.

While the principles of the invention have been shown and described in connection with but a few embodiments, it is to be understood clearly that such embodiments are by way of example and are not limiting.

I claim:

1. An apparatus for facilitating ground-handling of a personnel-carrying helicopter having landing skids free of front hooks and secured to struts comprising:

an axle extending across the skids;

a pair of spaced eyelets affixed to the axle and extending generally parallel thereto, each in position to receive one of the skids therethrough;

a pair of wheels rotatably attached to the axle; and means for securing the axle to the helicopter.

2. The apparatus of claim 1 wherein a handle is attached at the midpoint of the axle.

3. The apparatus of claim 1 wherein the axle comprises at least a pair of telescoping elongate members.

4. The apparatus of claim 3 wherein the telescoping members are adjustable to at least two different axle lengths.

5. The apparatus of claim 1 wherein the axle comprises at least three telescoping elongate members.

6. The apparatus of claim 1 wherein each eyelet has an opening large enough for ready insertion of a skid.

7. The apparatus of claim 1 wherein the securing means comprises a pair of straps secured with respect to the axle.

8. The apparatus of claim 7 wherein each strap is secured with respect to one of the struts.

9. The apparatus of claim 7 wherein the straps are of a flexible material.

10. An apparatus for facilitating ground-handling of a helicopter having landing skids secured to struts comprising:

an axle extending across the skids;

a pair of spaced eyelets affixed to the axle, each in position to receive one of the skids;

a pair of wheels rotatably attached to the axle; and a pair of straps made of flexible material secured with respect to the axle for securing the axle to the helicopter and having a plurality of hooks layered on one side thereof and a plurality of loops layered on the other side thereof such that the two sides are secured together when pressed together, thereby facilitating securement of the axle to the helicopter.

* * * * *